US006241063B1

(12) United States Patent
Van Ess et al.

(10) Patent No.: US 6,241,063 B1
(45) Date of Patent: Jun. 5, 2001

(54) CABLE REEL HAVING SLIP RING CAPSULE AND OVERWINDING PROTECTION

(76) Inventors: Quentin W. Van Ess, 4891 Mt. Bigelow Dr., San Diego, CA (US) 92111; Mark Wallbaum, 3950 Violet St., La Mesa, CA (US) 91941

(*) Notice: Subject to any disclaimer, the term of this patent is extended or adjusted under 35 U.S.C. 154(b) by 0 days.

(21) Appl. No.: 09/188,080

(22) Filed: Nov. 6, 1998

(51) Int. Cl.[7] .................................................. H02G 11/00
(52) U.S. Cl. ........................................................... 191/12.2 A
(58) Field of Search ........................ 191/12.2 A, 12.2 R, 191/12 R, 12.4

(56) References Cited

U.S. PATENT DOCUMENTS

| | | |
|---|---|---|
| 3,694,588 | 9/1972 | Appleton . |
| 4,527,683 | 7/1985 | Mathews . |
| 4,897,512 | 1/1990 | Johnston . |
| 5,330,122 | * 7/1994 | Wood ................................ 242/158 B |
| 5,498,940 | 3/1996 | Kim et al. . |
| 5,551,545 | * 9/1996 | Gelfman .......................... 191/12.2 R |

OTHER PUBLICATIONS

Litton Poly–Scientific Product Sheet #AC4023 "Slip Ring Capsule" (2 pages; Blacksburg, VA; undated).

Sandvik Steel Co., Spring Products Division Product Information Sheets "Constant Force Springs" (6 pages; Scranton, PA; undated).

Aero–Motive Company Product Sheet "Hand Wind Reels—125 Volt Duty" (1 page, Kalamazoo, MI; undated).

Industrial Electric Reels, Inc. Product Sheet "Spring Matic Super Saver Line" (1 page; Omaha, NE; undated).

* cited by examiner

Primary Examiner—S. Joseph Morano
Assistant Examiner—Robert J. McCarry, Jr.
(74) Attorney, Agent, or Firm—Brown Martin Haller & McClain LLP (57) ABSTRACT

A cable reel is disclosed which permits rapid and simple pay out and deployment of cable, retention of cable in operating position, and rapid and controlled retraction of the cable, without overrunning or overwinding of the reel. The reel utilizes a highly functional slip ring capsule which provides positive and continual communications contact and transmission, regardless of adverse weather conditions, handling or operating stresses, or other conditions which would otherwise affect transmissions in prior art devices. It also reduces damage to cables; premature loss of cables through workers' carelessness or deliberate discard of loose cables; operational delays caused by missing cables, or by workers being required to hunt for individual lengths of cable; and delays or malfunctions resulting from having cables of the wrong size, length, weather resistance, etc. A slip-on member prevents damage to the cable tip when the cable is dropped, and a retractable cover prevents damage to the cable tip.

18 Claims, 6 Drawing Sheets

CABLE REEL HAVING SLIP RING CAPSULE AND OVERWINDING PROTECTION

BACKGROUND OF THE INVENTION

1. Field of the Invention

The invention herein relates to cable reels. More particularly it relates to cable reels which experience severe service and are exposed to harsh weather conditions.

2. Description of the Prior Art

At commercial airports it is common for commercial aircraft to be manoeuvered to and/or away from passenger deplaning/boarding gates or cargo loading facilities by motorized push out/towing vehicles, which are often referred to as airport tugs. As part of such maneuvering, it is necessary for the tug driver and the airplane cockpit crew to be in verbal communication with each other. This is normally done by use of an communication cable running between the tug and the airplane. The cable is plugged into the aircraft's communication system, providing communication between the tug cab and the aircraft's cockpit, each of which includes ear phones and a microphone so that the tug driver and aircraft's pilot can talk to and hear each other.

Generally prior art tug-aircraft cables have been made of a single length of cable with plug-in connectors at each end. The cables are unwieldy for the tug driver or other ground crew members to handle and store. Since they have no permanent connections, it is common for cables which are not in use to be left lying on the tarmac or thrown across other pieces of ground equipment, resulting in frequent damage to the cables. The damage is usually severe enough to require discarding of the damaged cables. Since the cables are expensive, the cost to airlines of cable replacement are high.

There is therefore a need for a better way of handling communication cables for tug-to-airplane communication at airports. One way that such could be accomplished would be by having one end of the cable permanently connected to the tug for effective communication and the cable stowed on the tug between uses. However, in the past that has not proved feasible because stowage was difficult and time-consuming, so ground crews were often unable or unwilling to perform the stowage correctly. In addition, since the cable must be moved before and after connection to the airplane, and ground crews are frequently less than careful in their handling of the cable, it has been difficult with prior art equipment to maintain a good communication connection of the cable to the tug for any extended period of time, since rough handling has often damaged the connection equipment.

SUMMARY OF THE INVENTION

The present invention overcomes these prior art problems and provides a system which is reliable, provides consistently good communications, is easily handled and used by ground crews, and which permits cables to be used effectively for extended periods of time before replacement is needed.

We have now invented a cable reel which has these desirable features. The reel of this invention permits rapid and simple pay out and deployment of cable, retention of cable in operating position, and rapid and controlled retraction of the cable, without overrunning or overwinding of the reel. The invention utilizes a highly functional slip ring capsule which provides positive and continual communications contact and transmission, regardless of adverse weather conditions, handling or operating stresses, or other conditions which would otherwise affect transmissions in prior art devices. It also reduces damage to cables; premature loss of cables through workers' carelessness or deliberate discard of loose cables; operational delays caused by missing cables, or by workers being required to hunt for individual lengths of cable; and delays or malfunctions resulting from having cables of the wrong size, length, weather resistance, etc.

While there are a number of different types of cable reels available in the marketplace, none has the unique and advantageous features of the present invention, especially as to the unique slip ring capsule and slip clutch overrunning and overwinding prevention member. These components have never before been used in or even recognized as applicable to cable reels. Consequently the cable reels of this invention permit airports, airlines, and other users of cable to achieve substantial savings in costs, cable inventory and operating time since appropriate cables, in highly operable condition, will be readily available right where needed, when cable reels of the present invention are mounted directly on airport tugs and similar point-of-need vehicles. Nothing in the prior art has heretofore been capable of providing such useful and functional devices.

In a broad embodiment, the present invention involves a cable reel comprising a support frame having an elongated shaft projecting therefrom, the shaft having a central axial aperture extending therethrough; a slip ring capsule disposed at an end of the shaft distal to the frame. the slip ring capsule having a rotor and a stator in mutual electrical contact, the stator being fixed to the shaft; a reel having a hub comprising a hollow drum with lateral sides projecting radially therefrom, with the hub mounted on the shaft for rotation therearound and the sides having sufficient height to contain a communication cable therebetween wound on the hub; mechanical and termination junction means for mechanical and continuity attachment of one end of the communication cable to an outer side of the hollow drum, with the termination junction means further comprising a first communication circuit from the attachment to the one end of the communication cable through a wall of the hollow drum to communication connection with the rotor of the slip ring capsule; a second communication circuit extending through the central aperture of the shaft and having terminal connection to the stator of the slip ring; driving means for alternately rotating the reel about the shaft in a first direction to pay out a cable contained thereon and attached thereto and for rotating the reel about the shaft in an opposite second direction to retrieve paid out cable for containment on the reel; and overwinding protection means for preventing the driving means from being overwound when rotating in either direction; such that the slip ring capsule maintains full continuity between the first and second communication circuits while the reel is rotating and the driving means and the clutch means cooperate during retrieval of paid out communication cable to permit rapid retrieval of the cable without overwinding of the driving means.

Also part of the invention are a strain relief element to prevent strain on the communication cable where it plugs into the connector with the aircraft's communication system, and a protective device into which the connection end of the cable retracts when not in use, to prevent damage if the end of the cable strikes the tarmac or adjacent equipment.

There are numerous specific embodiments of the invention, representative examples of which are described below. The reels of the present invention may be made of many different types of materials, may be spring- or motor-driven, may be of any appropriate reasonable size for a particular task, may be mounted on vehicles or on stationary bases, may be used indoors or outside exposed to different types of adverse weather conditions, may be used with various accessories, and so forth.

Those skilled in the art will immediate recognize the many possibilities for the embodiments and end uses of the present invention from the descriptions provided below.

DETAILED DESCRIPTION AND PREFERRED EMBODIMENTS

Figure 1:
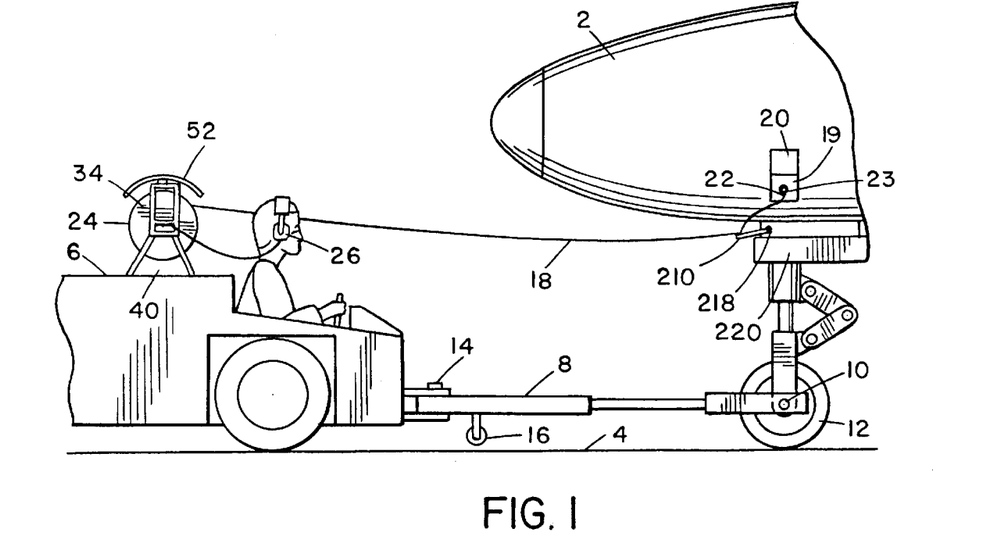
FIG. 1 is an elevation view illustrating a cable connection between a tug and an airplane utilizing the cable reel of the present invention.

The invention is best understood by reference to the drawings. FIG. 1 illustrates a typical and important end use application of the present invention. (Other potential end use applications will be discussed below.) An aircraft 2 which is on the airport tarmac 4 is connected to an airport tug 6 by a tow/push bar 8. At one end bar 8 is releasably clamped to the hub 10 of the aircraft's nose wheel 12 and at the other end is releasably attached to the tug's tow ball 14 on which it can swivel and rock in a conventional tow/push manner. The tow/push bar also commonly has a dolly wheel 16 which allows it to be moved other than by the tug 6. All of this is conventional.

The cable reel of the present invention is part of the communication system between the tug 6 and the aircraft 2. This system includes a communication cable 18 which at its free end 22 has a plug 21 (FIG. 4) which plugs into a conventional communications jack 23 on the aircraft inside a recess 19 which may be closed by hatch cover 20. This connection provides communication access to the voice communication system within the aircraft to the cockpit crew. At the other end the cable is connected through the cable reel 24 of this invention to the tug driver's headset 26 as will be discussed below. The cable reel 24 is mounted on the tug 6 at a position and in a manner to be discussed below.

Upon arrival of the aircraft 2 at the airport it will taxi either directly to a passenger gate or cargo handling facility where it is attached to the tow/push bar 8 of tug 6 or to a location on the tarmac at which it is attached to the tow/push bar 8 of tug 6 and towed or pushed to such gate or facility. In either case, at the time when the tow/push bar 8 is attached to the aircraft 6 cable 18 is unreeled from reel 24, hatch cover 20 is opened, and the free end plug 22 of cable 18 is plugged into jack 23 to make communication connection with the internal aircraft communication system, such that the tug driver and aircraft cockpit crew can thereafter talk to each other. Upon departure of the aircraft from the gate or facility, the free end plug 22 of cable 18 is disconnected from the aircraft's jack 23 in recess 19, the hatch cover 20 is closed, cable 18 is retracted onto reel 24 in the manner to be described below, tow/push bar 8 is detached from the aircraft's nose wheel hub 10, and the aircraft is free to taxi away from the gate or facility to the runway for takeoff. If the aircraft 2 cannot depart from the gate or facility on its own, the tug 6 will use tow/push bar 8 to push or tow the aircraft 2 away from the gate or facility to a point on the tarmac from which the aircraft can manoeuver on its own, at which point the cable 18 and tow/push bar 8 are disconnected from the aircraft 2 as described above and the aircraft can then proceed on its own for takeoff.

The present invention resides in the cable reel 24 and its use and permanent mounting on the tug 6. In particular, the reel 24 of this invention has a slip ring capsule 28 and an overwinding prevention mechanism such as clutch 128/brake 130 or electric motor 32, both of which are unique in cable reel technology to the present invention, and both of which act synergistically to permit the cable 18 to be drawn from the reel 24 and connected to the aircraft 2, and then disconnected from the aircraft 2 and retrieve and rewound onto the cable reel 24 rapidly, easily, repeatedly and without damage to the cable 18.

Figure 2:
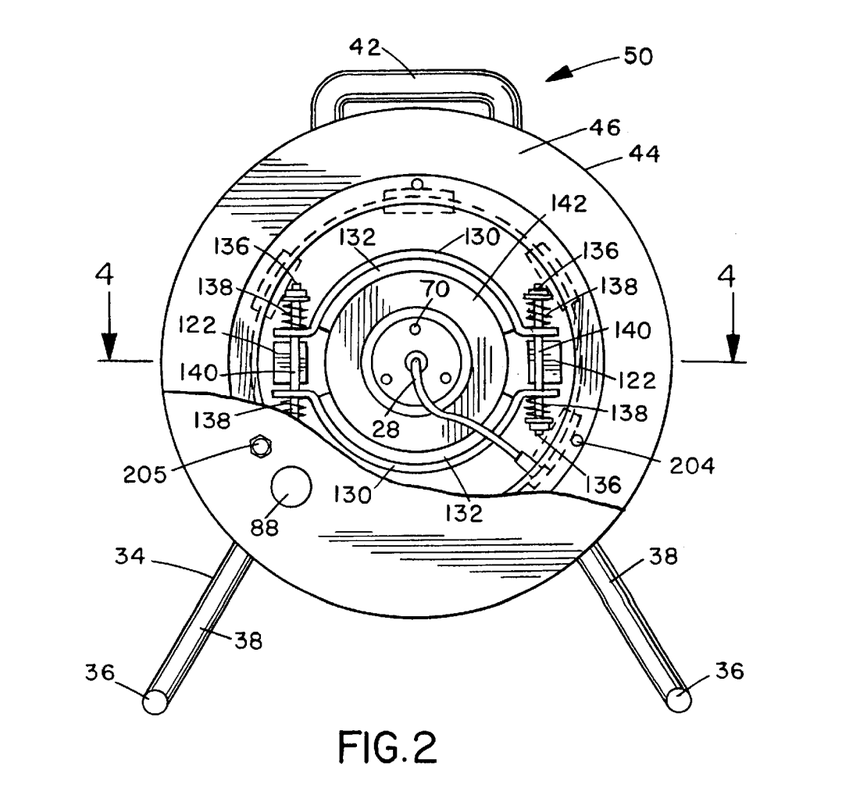
FIG. 2 is a front elevation view, partially cut away, of one embodiment of a cable reel of the present invention.
Figures 3, 5:
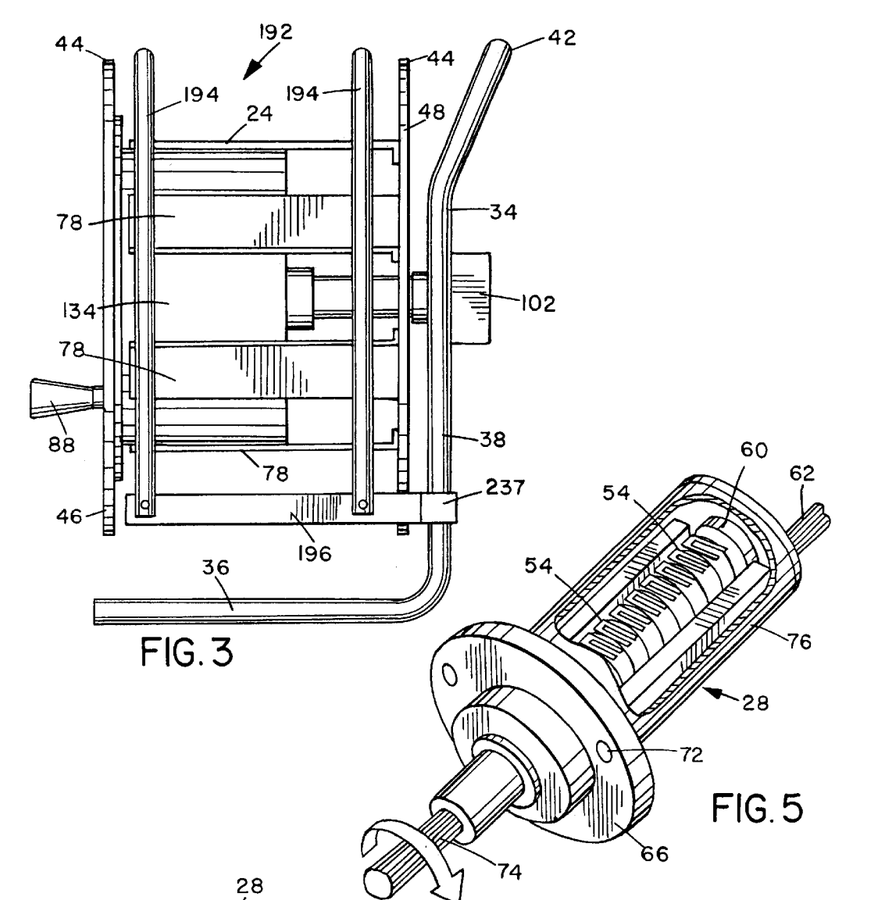
FIG. 3 is a side elevation view of the cable reel embodiment of FIG. 2.
FIG. 5 is an oblique view, partially cut away, of a slip ring capsule of the type useful in the present invention.
Figure 4:
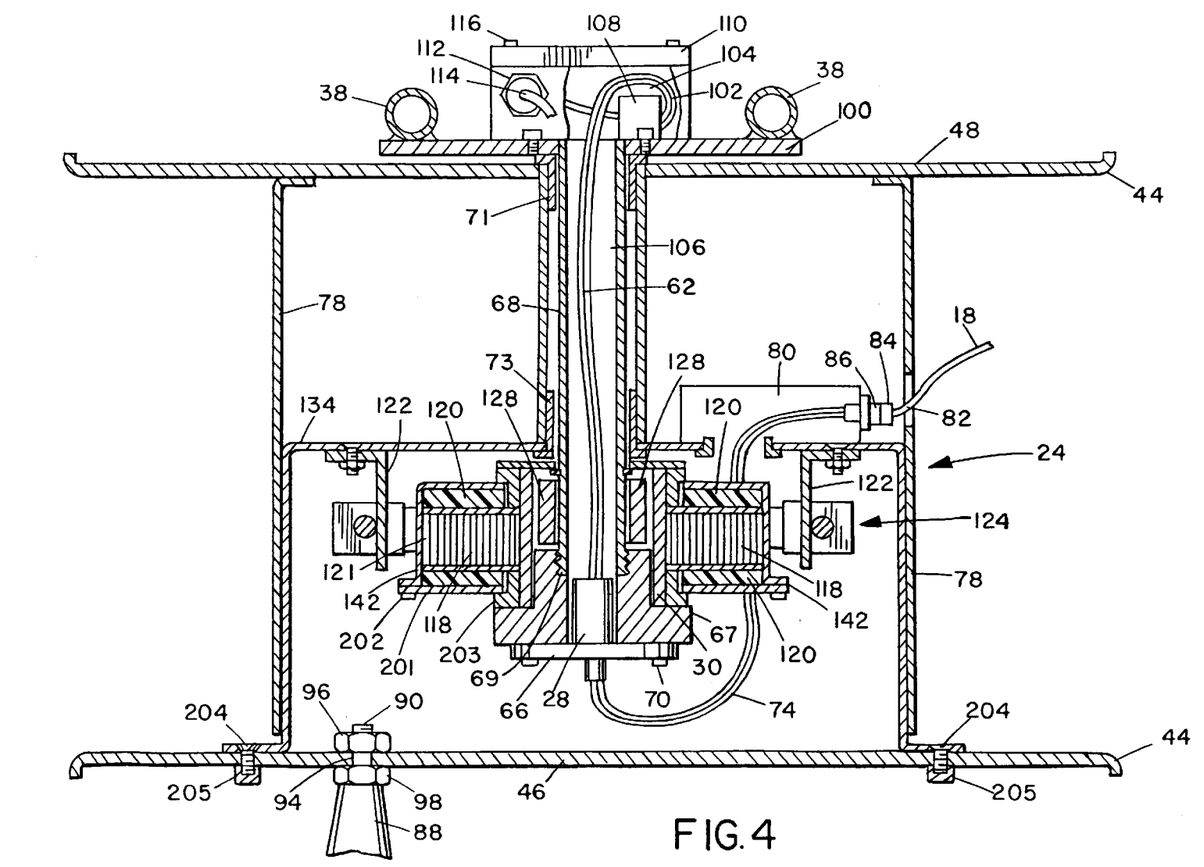
FIG. 4 is a cross-sectional view of a cable reel of this invention taken on Line 4—4 of FIG. 2.

Turning then to the structure of the cable reel 24 as illustrated in FIGS. 2–4, there is first a frame 34 on which the reel 24 is journaled for free rotation. The base 36 formed by the legs 38 of the frame 34 also provide for mounting of the reel 24 on the tug 6 as shown at 40 (FIG. 1). Mounting can be by any convenient means, such as by bolts or screws secured into the body or frame of the tug 6, pipe-clamp-like brackets overarching portions of the base 36 and attaching the base to the body or frame of the tug 6, or other well-known hold-down mechanisms. The frame may be attached to the tug 6 at any location thereon which is convenient for operation of the reel 24 by the driver of the tug and which provides for easy and unimpeded withdrawal of the cable 18 off the reel 24 and retraction of the cable 18 back onto the reel. The precise location will be a matter of choice and will be in part determined by whether the reel is to be hand-operated or motor-driven, as will be described below.

The frame 34 commonly extends upward to a cross member 42 above the top of the perimeters 44 of the sides 46 and 48 of the reel 24 and can be used as a carrying handle for the reel (as illustrated at 50 in FIG. 2) or can be used to mount a sun or heat shield 52 thereonto, as illustrated in FIG. 1, to protect the reel 24 and cable 18 from the elements during inclement weather or from deterioration from exposure to direct sunlight when the tug 6 and cable 18 are parked out-of-doors.

Figure 6:
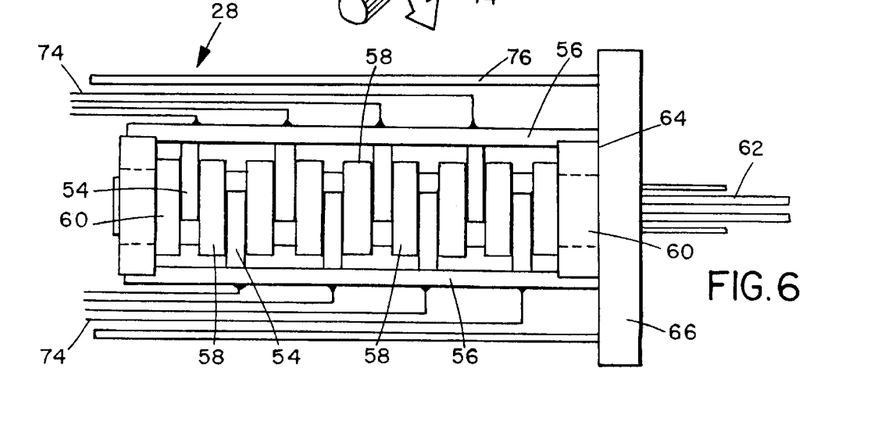
FIG. 6 is a schematic axial centerline cross-section view of the slip ring capsule of FIG. 5.

The slip ring capsule is best understood by reference to FIGS. 5 and 6. Slip ring capsules are not new, but their utilization in a cable reel is a principal aspect of the unexpected synergy of the use of the reel and cable in the present combination of components. The slip ring capsule comprises a plurality of contacts 54 which are fixed to rotor 56 of slip ring capsule 28 and which rotate with the rotation of reel 24, the rotor rotating on fixed bearings 60. The contacts make permanent but sliding continuity contact with fixed intermediate plates 58 which provide continual continuity connection between the moving contacts 54 and fixed cable leads 62. Cable leads 62 extend axially into the interior of the stator structure formed by the interconnection of the conductors 58 and is connected to the interior edge of each conductor. The stator structure is in turn fixed at its outward end 64 to bearing 60 and through the bearing 60 to the end cap 66 of the capsule 28, which in turn is anchored by screws 70 mounted through screw holes 72 to anchor block 67 on the free end 69 of fixed shaft 68 on which the reel 24 turns, running on bearings 71 and 73. The rotor bearings 60 are preferably ball bearings to maximize bearing life. The slip ring capsules provide much more consistent and longer lived continuity between the stator leads 62 to the moving leads 74 to the tug driver's headset 26 and the pilot's headset than it is possible to get with common rotating contact structures. Further, the enclosure of the entire unit within housing 76 seals the stator and rotor conductors from the elements and insures their reliable operation in any type of inclement weather.

Figure 7:
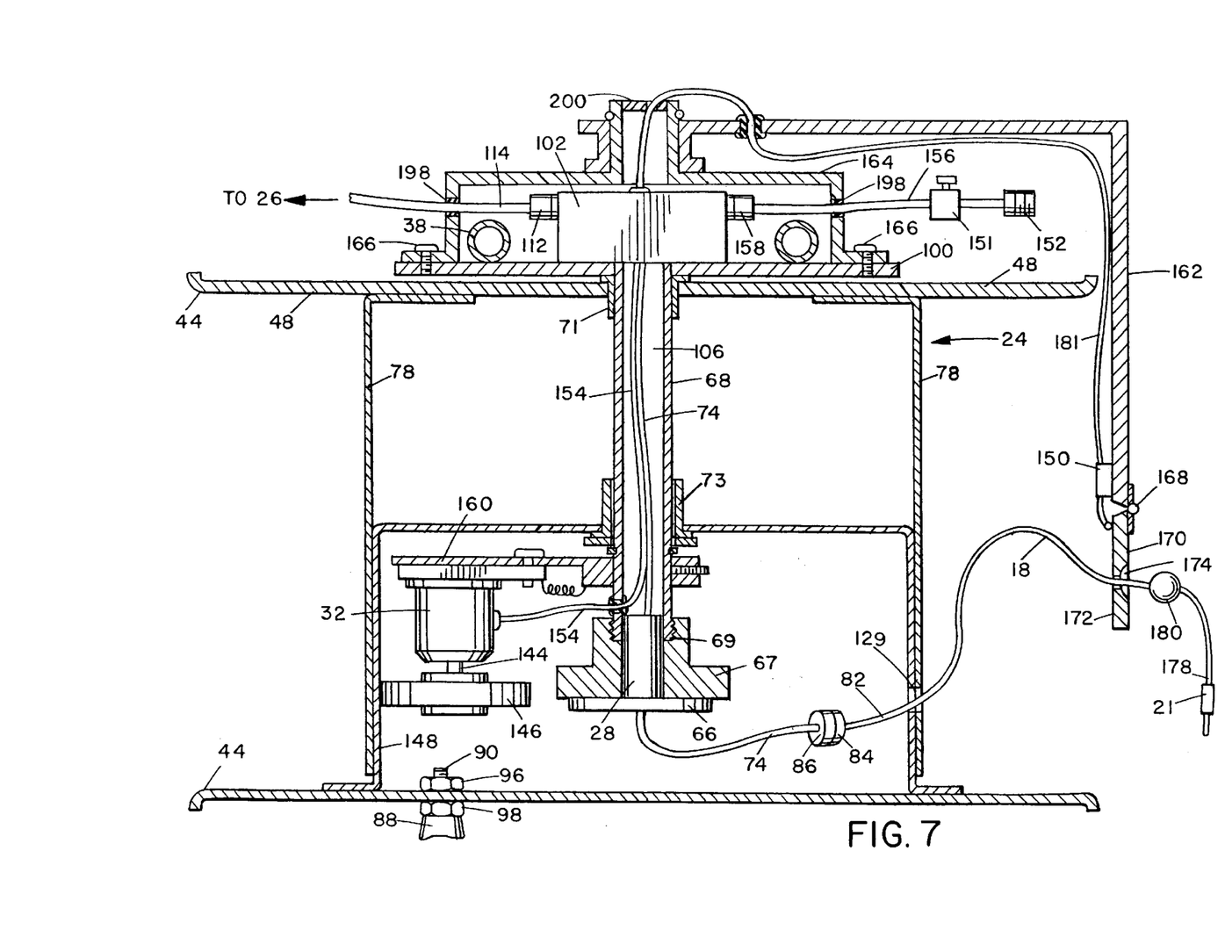
FIG. 7 is a cross-sectional view, similar to that of FIG. 4, of another embodiment of a cable reel of this invention.

Embodiments of the interior structure of the reel 24 are best seen in FIGS. 4 and 7, of which FIG. 4 will be considered first. The reel 24 is formed of outer sides 46 and 48, reel drum 134 and bracket supports 78. The outer side 48 is fixed and anchored to support brackets 78, and the outside 46 is anchored to the reel drum 134 and is removable for access to the internal components discussed below. Outer side 46 is anchored in place by self-clinching studs 204 affixed to reel drum 134 with retaining nuts 205. The outer sides 46 and 48 have folded edges 44 to provide rigidity. Connector box 80 is anchored to the reel drum 134 providing means for mounting communication connector 86. Rotor leads 74 of the slip ring capsule 28 are routed within the reel drum 134 through grommet 124 for termination to the communication connector 86. Communication cable 18 is provided at one end 82 which a cable connector 84 for connection to communication connector 86, and at the other end 22 is provided with plug 21 for connection to a jack 23 which is part of the aircraft's communication system. The communication cable 18 is a separate unit, and in the event of failure it can be readily disconnected from the reel at one end and the aircraft at the other end and replaced with another cable 18 within seconds.

The reel drum 134 is sufficiently wide, and the walls 46 and 48 sufficiently high, to hold all of the length of cable 18 on the reel 24 when the cable is retracted. The reel may therefore be of any convenient size that the user wishes, and the reels of equal cable capacity may be proportioned with different sized walls and support, so that one may have a wide, shallow reel, a deep, narrow reel, or any intermediate configuration. We have found convenient sizes for tug-to-aircraft cables to be reels of 10"–13" (25–33 cm) diameter and 6"–9" (15–22 cm) width, but other dimensions can of course be used, depending on the length of cable to be contained and the diameter and flexibility of the cable. Those skilled in the art will be readily able to determine the appropriate dimensions for any contemplated end use.

The embodiment of the cable reel shown in FIGS. 2–4 provides for hand winding of the reel. A crank handle 88 has a threaded shaft 90 on which it rotates, one end of which projects from its base 92. Shaft 90 projects through hole 94 in the wall 46 and the handle 88 is attached to wall 46 by threading nut 96 onto shaft 90 and tightening it. A bearing 98 allows for free turning of the handle 88 on the shaft 90. To operate the cable reel 24 the user merely grasps handle 88 and cranks to turn the reel 24 and reel in or pay out the cable 18.

Shaft 68 is attached to plate 100 which in turn is attached to legs 38 of frame 34. Also attached to plate 100 is junction box 102 whose hollow interior 104 is open to the hollow interior 106 of shaft 68 so that stator lead 62 can pass through shaft 68 into junction box 102. Junction box 102 in turn has internal termination point 108 which connects the stator leads 62 to the end of cable 114 to the headset 26. Box 102 is conveniently closed by lid 110 by means of screws 116. A strain relief connector 112 is connected to box 102 to provide firm attachment and strain relief for cable 114.

In its preferred mode, however, the embodiment of cable reel 24 shown in FIGS. 2–4 will be spring-loaded for retraction of the cable 18 after pay out by pulling on the cable 18. Within the reel 24 is a spring drum 142 containing a power spring 118 which is anchored at its outer end 120 to the spring drum 142. The inner end of the power spring 118 is anchored to the clutch sleeve 30. Within the spring drum 142 are spacers 120 to position the power spring 118 and allow for free spring movement without sticking. The spring drum 142 is provided with a cover plate 201 and is anchored to the spring drum 142 with retaining screws 202. The cover plate 201 is removable from the spring drum 142 to allow for replacement of the power spring 118. Flange bearings 203 are provided in the spring drum 142 to allow for rotation of the clutch sleeve 30. The clutch sleeve 30 has an integral clutch bearing 128 to provide positive locking to shaft 68 during pay out of cable 18 and to prevent overrunning on the power spring 118 during rewinding of the cable 18. The spring drum 142 with its component parts is secured to the shaft 68 by the anchor block 67.

As the cable 18 is being paid out by being pulled off the cable reel 24, the rotation of the reel 24 winds the power spring 118 and builds up increasing torsion. This is accomplished by the clutch shoes 130 with brake lining 132 being attached 180° apart to the exterior of the spring drum 142 and anchored to the reel drum 134 by the clutch show mounting brackets 122. The clutch shoe mounting brackets 122 contain threaded shafts 140, compression springs 138 and adjustment nuts 136. Adjustment of the adjustment nuts 136 against the compression springs 138 allow the power spring 118 to be wound to its full potential. Pulling of the communication cable 18 beyond the power spring's full potential will cause the power spring drum 142 to slip, providing a seamless action between the clutch shoes 130, thus preventing overwinding.

In addition to the clutch shoes 130 preventing overwinding of the power spring 118, spring retraction capability permits the communication cable 18 to be extended to the full length of cable provided on the reel 24. Cable retraction will be automatic for the amount of the wound spring capacity, and any cable length extended beyond that capability will be rewound on the reel 24 by hand cranking of the reel 24 by use of handle 88.

A related but different embodiment of the invention is illustrated in FIGS. 7–10. In this embodiment the reel 24 is motor-driven rather than spring driven. Mounted on bracket 160 which is attached to shaft 68 within the interior of reel 24 is an electric drive motor 32, on the shaft 144 of which is mounted friction drive wheel 146. Drive wheel 146 is in frictional engagement with the interior surface 148 of reel drum 134, such that rotation of drive wheel 146 by motor 32 causes reel 24 to turn. Since normally the tug driver or another ground crew person will pull the cable 18 off of the reel 24 and pay it out to the aircraft 2 so that the plug 21 can be plugged in to the aircraft system's jack 23, motor 32 does not need to run during pay out, although it should be free to turn in response to the turning of the reel 24 as the cable 18 is pulled out. The motor does, however, need to run to hold tension and to retract the cable 18 after it is disconnected from the aircraft 2. The clutch slips so that the cable is held off the tarmac. Consequently the motor does not need to be reversible and circuitry to provide reversibility is not required. It is contemplated, however, that if desired a stepping motor could be used, reversing circuitry provided (preferably in junction box 102, microswitch 150 eliminated, and switch 151 replaced by an on-off-on reversing switch or a similar device to operate the reversing circuitry.

Figure 8:
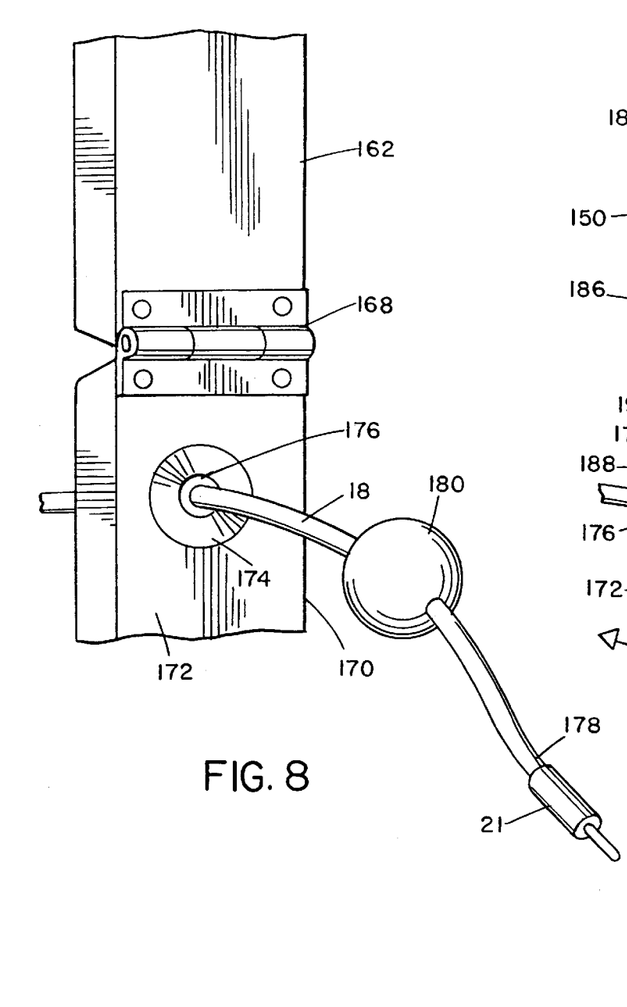
FIG. 8 is a partial oblique view of a microswitch useful with the cable reel embodiment illustrated in FIG. 7.
Figures 9A, 9B:
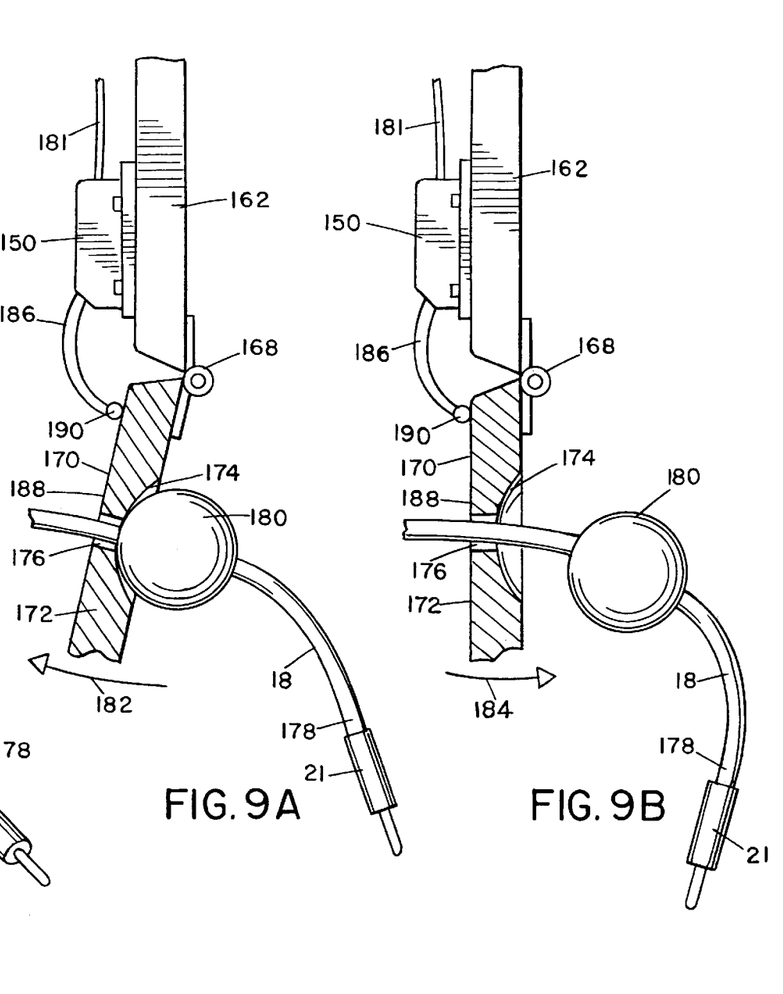
FIGS. 9A and 9B are schematic side view diagrams, partially in section, illustrating respectively the deactivated (off) and activated (on) positions of the microswitch of FIG. 8.
Figure 10:
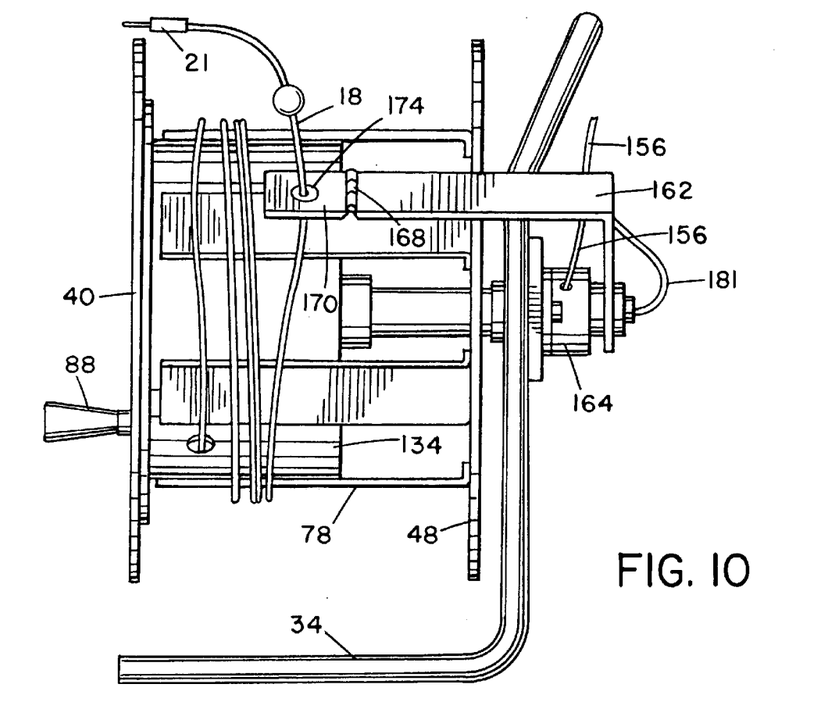
FIG. 10 is a side view of the cable reel embodiment illustrated in FIG. 7.

Motor 32 is preferably a 12V DC motor powered by the tug's 12V battery 152 through electric lines 154 and 156. A normally open switch 151 in line 156 between the battery 152 and the motor 32 is mounted on the dashboard of the tug 6 where it can be operated by the tug driver. Electric line 154 leads from motor 32 to junction box 102 where it couples to line 156 through a coupler within box 102 which in turn is connected to connector 158. Microswitch 150 which is mounted on bracket 162 which is attached to housing 164 which is bolted to plate 100 by screws 166. Electric line 181 leads from junction box 102 to microswitch 150 and is connected to lines 154 and 156 in a conventional manner in which both switches 150 and 151 must be closed in order for motor 32 to run. The operation of microswitch 150 is illustrated in FIGS. 8, 9A and 9B. At the distal end of bracket 162 is a hinge 168, one leaf of which is attached to bracket 162 and the other leaf of which is attached to a deactivation lever 170. In the embodiment shown, deactivation lever 170 is in the form of a thick plate 172 with a central recess 174 having a hole 176 at the center of the recess. Cable 18 passes through the hole 176. Fixed near the aircraft (distal) end 178 of cable 18 is a ball 180 or similar block. Ball 180 is sized to fit part way into recess 174 but to be too large to fit through hole 176. Consequently, when the cable 18 is fully retracted, ball 180 is pulled into recess 174 and biases deactivation lever 170 is a backward direction as indicated by arrow 182. A spring-loaded switch lever 186 in biased to be in continual contact with the back side 188 of deactivation lever 170 at 190. Switch lever 186 is operably connected to microswitch 150 so that when ball 180 is seated in recess 174 and biases deactivation lever 170 backward, switch lever 186 causes microswitch 150 to open and stop motor 32, so that no further retraction of cable 18 occurs (FIG. 9A). Thereafter when cable 18 is pulled or paid out, ball 180 moves out of recess 174 and the spring-loading of switch lever 186 biases it outwardly from microswitch 150 which in turn biases deactivation lever 170 in a forward direction as indicated by arrow 184. The stroke distance of switch lever 186 is short and only moves deactivation lever 170 to a position parallel with bracket 162 (FIG. 9B), and also returns microswitch 150 to a closed position, closing the circuit through line 181. Switch 151 is, however, a timed switch, and once pushed by the driver to close, reopens after an interval slightly longer than the time period needed to retract all of the cable 18. In operation, therefore, normally the circuit through microswitch 150 is closed and the circuit through switch 151 is open. When the paid-out cable 18 is to be retracted, the tug driver pushes switch 151 which closes it and starts motor 32. Switch 151 remains closed as the cable retracts. When the cable has retracted to the amount desired, prepositioned ball 180 contacts deactivation 172 and causes microswitch 150 to be opened, cutting the electricity from battery 152 to motor 32 and stopping the motor. Thereafter, at the end of its timed period, switch 151 opens and remains open until again pushed, so that even when cable 18 is again paid out and microswitch 150 closes, current remains cut to motor 32 until switch 151 is pushed.

FIG. 3 also shows another useful element of the cable reel of the present invention. It is advantageous to attach a cable guide to the cable reel, to guide the cable 18 on and off the reel 24 and prevent cable from riding over the tops of walls 46 and 48. The cable guard 192 consists of two circular rods 194 which curve around cable reel 24 and parallel the surface of cable support 78 but are spaced at a distance from the surface which is greater than the thickness of the body of cable 18 when cable 18 is fully retracted onto the reel 24, but not so much greater that the cable 18 can move under either of the rods 194 and roll up over the top of wall 46 or 48. Rods 194 do not entirely encircle the reel 24, but will encircle about 50%–75% of it, being open at the bottom of the reel. Each end of each rod 194 is attached to a respective support 196 which in turn is attached to a leg 38 of frame 34 by a bracket 237.

The cable reel of this invention may be made of any convenient material, including various metals and plastics. Spring steel, steel, stainless steel, aluminum, titanium, and various alloys of these and other metals may be used for appropriate parts, as can plastics such as the various engineering plastics and thermosets, as well as high density thermoplastics. Of course the various electrical parts will be made of appropriate electrically conductive materials such as copper or aluminum. The crank handle may be of metal, wood or plastic. Those skilled in the art will have no difficulty determining the appropriate materials for the various parts of the device by common knowledge or routine experimentation.

It will also be advantageous in all applications where the device will be used outdoors to make all parts out of weather resistant materials, and to seal all openings with weather resistant seals, gaskets or sealing compounds. To avoid undue complexity in the drawings, only two typical examples have been shown, both in FIG. 7, where the ports through which electric lines 114 and 156 exit from housing 164 are shown as sealed with sealing compound 198 while the port through which line 181 exits from housing 164 is shown as sealed by plug or gasket 200. It will be evident to those skilled in the art where other locations exist which can advantageously be weather-sealed and what types of sealants would be appropriate. Further, it may be appropriate to coat exposed parts with weather resistant coatings, such as plastic or elastomeric coatings, avoiding of course applying the coating in a manner which would foul moving parts.

Figure 11:
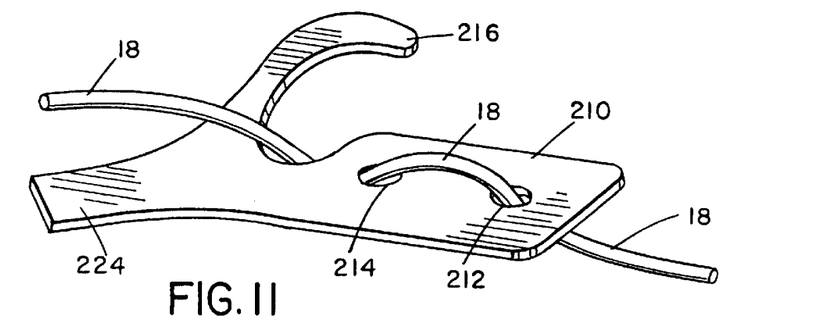
FIG. 11 is a perspective view of a cable stress relief member of the present invention.

The invention also includes a strain relief member 210 which is illustrated in FIG. 11. The cable 18 is threaded through holes 212 and 214 in the member 210 so that the member is permanently mounted on the cable 18. As shown in FIG. 1, the strain relief member is normally positioned near the distal end 22 of the cable 18. In use the hook portion 216 of the member 210 is hooked around one of the hinges 218 of the wheel well door 220 of the airplane, (or any other convenient attachment point on the airplane close to the recess 19). The member 210 should be positioned on the cable 18 such that the free length of the cable 18 between where it passes through hole 214 and the free end 22 is longer than the distance between where member 210 is hooked to the hinge 218, so that when plug 21 is plugged into jack 23 the free length of cable is under no strain. If a strain is placed on the remaining length of the cable 18 between the reel 24 and the member 210, such as by a movement of the tug 6, that strain is taken up by the member 210 as the cable 18 is paid out, and the connection between plug 21 and jack 23 does not become disconnected.

One end 224 of the member 210 is conveniently formed in a pry-bar or screwdriver end shape, so that it can be used by the tug operator to operate door latches 20 (before hooking the member 210 to the hinge 218). This will eliminate the current practice of workers to use the tip of plug 21 to open door 20, which can cause serious damage to the plug 21.

Figure 12:
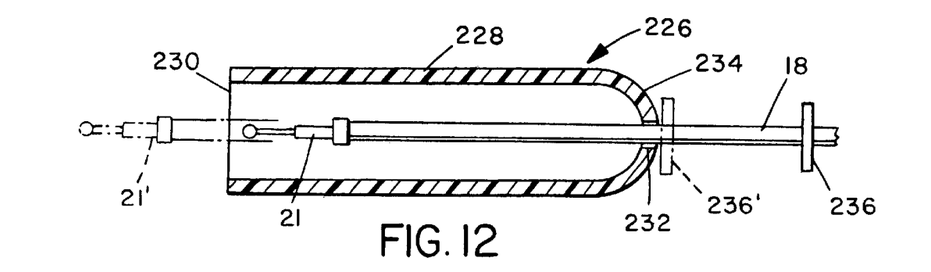
FIG. 12 is a side elevation view, partially in section, of the retraction member for protection of the connection end of the cable when the cable is not in use.

Another notable feature of the present invention is the retraction tube 226 which prevents the plug 21 from being damaged if the end 178 of the cable 18 is dropped onto the tarmac or hits adjacent equipment. The tube 226 consists of a hollow elastomeric sleeve 228 which is completely open at one end 230 and which has a small hole 232 at the other end 234. Cable 18 is threaded through hole 232 and a stop plate 236 is mounted on the cable 18 a short distance outside the tube 226 so that the cable 18 cannot be pulled into the sleeve 228 any farther than where the stop plate 236 is mounted. Normally the plug 21 is retracted into the sleeve 228 so that no part of it is exposed to damage. When a communication connection between the tug 6 and aircraft 2 is to be made, the tug driver extends the plug 21 and cable 18 out of the end 230 to the position shown at 21'. Simultaneously cable is pulled into the interior of the sleeve 228 through hole 232, which moves stop plate 236 to position 236' and prevents the plug 21 from being extended any further out of the sleeve 228. As the plug 21 is pulled out of the jack 23 to disconnect the tug and airplane communication, the plug 21 usually retracts readily into the interior of sleeve 228 by urging of the cable 18. In the event that it doesn't fully retract, however, it is easy for the worker to slip the sleeve 228 manually out over the exposed end of plug 21.

In addition to the cable guard and cover which are mentioned above, it will be understood that numerous other accessories or useful additions may be used with the basic cable reel. For instance one can have a counter mounted so that the cable must be paid out and/or retracted through the counter, which records the length of cable paid out or retracted; separately or in conjunction with such a counter one could provide an alarm system that sounded or otherwise delivered a warning when a predetermined amount of cable had been paid out, to avoid having the bitter end 82 of the cable pulled from the reel. One could also include an continuity electric line within the cable sheathing, which would set off an alarm if the cable became separated from the aircraft or other connected vehicle, device, etc. inadvertently. Numerous other additions will no doubt readily occur to those skilled in the art. It is intended that all such variations and routine additions and modifications be considered to be part of the present invention and included within the scope of the claims herein.

While the present device has been defined above in the context of use for tug-to-aircraft communications, it will be evident that there are many other potential end use applications for the device. For instance, anywhere that a modest length of cable, rope, wire, etc. must be paid out and retracted repeatedly could advantageously use the present invention, whether the cable reel is to be mounted on a moveable vehicle like an airport tug or on a stationary base. Such applications occur on ships; at locations where cargo is loaded onto or offloaded from trucks, ships, or trains; and in locations where crowd control or control of direction of persons' movements are required.

As noted above, the device may be of any convenient size, limited only by the ability of the motor, spring or other motivating device to drive the cable reel in a controlled manner. Typically these cable reels will be relatively small and used for paying out and retracting modest lengths of cable, usually from about 10'–100' (3–33 m) of cable. Longer lengths can be handled where the cable is lighter, and shorter lengths where the cable is heavier. Again those skilled in the art will have no difficulty determining appropriate sizes of reels for particular tasks.

Also, while the reel has been exemplified herein by description for use with a communication cable, it will be understood that any type of cable may be used with the reel of this invention, including but not limited to data transmission cable, optical fiber cable, telecommunications cable, television, telephone and radio transmission cable, and the like.

The reel can be made weather resistance by use of weather resistant materials such as stainless steel, coated metal, plastics and the like. It can be partially or almost fully enclosed as long as pay out and retraction of the cable is not adversely affected. Further, it can be made demountable from a tug or other structure to which it may be attached, such that it can be moved to different locations, or reels can be interchanged. In addition, the cable (being a separate component) can be inadvertently or accidently disconnected and, once reattached, will continue in entirely satisfactory service.

It will be evident that there are numerous other embodiments of the present invention which, while not expressly described above, are clearly within the scope and spirit of the invention and are the equivalents thereof The above description is therefore to be considered to be exemplary only, and the actual scope of the invention is to be determined solely from the appended claims.

We claim:

1. A cable reel comprising:

a support frame having an elongated shaft projecting therefrom, said shaft having a central axial aperture extending therethrough;

a slip ring capsule disposed at an end of said shaft distal to said frame, said slip ring capsule having a rotor that rotates on fixed bearings and a stator that is fixed to said shaft, wherein said rotor and said stator are in mutual electrical contact;

a reel having a hub comprising a hollow drum with lateral sides projecting radially therefrom, with said hub mounted on said shaft for rotation therearound and said sides having sufficient height to contain a communication cable therebetween wound on said hub;

mechanical and termination junction means for mechanical and continuity attachment of one end of said communication cable to an outer side of said hollow drum, with said termination junction means further comprising a first communication circuit from said attachment and a communication cable wherein said communication cable extends through a wall of said hollow drum to allow a communication connection with said rotor of said slip ring capsule and said communication cable is connected to one end of said communication circuit:

a second communication circuit extending through said central aperture of said shaft and having terminal connection to said stator of said slip ring;

driving means for alternately rotating said reel about said shaft in a first direction to pay out a cable contained thereon and attached thereto and for rotating said reel about said shaft in an opposite second direction to retrieve paid out cable for containment on said reel; and overwinding protection means for preventing said driving means from being overwound when rotating in either direction;

such that said slip ring capsule maintains full continuity between said first and second communication circuits while said reel is rotating and said driving means and said clutch means cooperate during retrieval of paid out communication cable to permit rapid retrieval of said cable without overwinding of said driving means.

2. A cable reel as in claim 1 wherein said driving means comprises a power spring having two ends and mounted within said drum, with an inner end connected to said clutch sleeve and an outer end connected to an inner surface of said drum, and aligned to extend as said reel rotates in said first direction to pay out cable and to resile under torsion and cause said reel to rotate in said second direction to retrieve paid out cable.

3. A cable reel as in claim 2 wherein said overwinding protection means comprises an overrunning clutch mounted on said drum, which is in turn attached to mounting brackets anchored to the drum through compression springs and adjustment nuts.

4. A cable reel as in claim 1 wherein any length of cable can be pulled from and retracted to said reel, up to the full length of a cable mounted on said reel.

5. A cable reel as in claim 1 having mounted thereon a cable which is detachably mounted to said reel at one end and capable of disconnectable connection to a target circuit at another end, such that following failure of or damage to said cable, it can be disconnected from said reel and said target circuit and discarded without disruption of any other portion of said reel or said target circuit.

6. A cable reel as in claim 1 wherein said driving means comprises a reversible motor in driving contact with said reel, such that activation of said motor to rotate in a first direction motivates said reel to rotate in one direction and activation of said motor in a reverse direction motivates said reel to rotate in a reverse direction.

7. A cable reel as in claim 6 wherein said motor comprises a rotating shaft and is mounted to said shaft within said hollow drum, said shaft having mounted for rotation therewith thereon a friction wheel, a perimeter of said friction wheel being directly or indirectly in frictional contact with said inner surface of said hollow drum, such that activation of said motor to rotate said shaft and wheel motivates said reel to rotate.

8. A cable reel as in claim 7 wherein said perimeter of said friction wheel is in direct contact with said inner surface of said hollow drum such that said reel rotates in a direction opposite to the direction of rotation of said friction wheel.

9. A cable reel as in claim 7 wherein said perimeter of said friction wheel is in indirect contact with said inner surface of said hollow drum through an idler wheel such that said reel rotates in the same direction as the direction of rotation of said friction wheel.

10. A cable reel as in claim 7 further comprising switch means responsive to retrieval of cable, said switch means upon detection of complete retrieval of cable causes said motor to be deactivated and cease further retrieval of cable.

11. A cable reel as in claim 10 wherein said overwinding protection means comprises an overrunning clutch mounted on said shaft, said clutch having a stator member attached to said shaft and a rotor member attached directly or indirectly to said inner surface of said hollow drum, such that upon completion of retrieval of cable said reel can decrease rotation gradually without overwinding said motor.

12. A cable reel as in claim 1 further comprising brake means mounted on said frame and in frictional contact with said drum to halt rotation of said reel upon completion of pay out or retrieval of cable.

13. A cable reel as in claim 12 wherein said brake exerts greater braking force against reel rotation in one direction than against reel rotation in an opposite direction.

14. A cable reel as in claim 1 comprising a communication cable disposed on said reel and mechanically and electrically attached thereto, and wherein said second end of said second electrical circuit terminates in connection to a first signal communication device, and an end of said cable distal to said reel terminates in connection to a second signal communication device, such that an electrical signal generated in either communication device is transmitted through said second circuit, slip ring, first circuit and cable to the other communication device.

15. A cable reel as in claim 14 wherein said cable reel is mounted on a first vehicle, with said first communication device also on said first vehicle, and said second communication device is mounted on a second vehicle, such that connection of said vehicles through said cable permits signal communication between said vehicles.

16. A cable reel as in claim 1 wherein said rotor and stator of said slip ring capsule each comprises a plurality of radial electrical contacts projecting therefrom, said rotor and stator having identical numbers of contacts in said plurality, and said contacts being spaced on said respective rotor and stator such that corresponding contacts on said rotor and stator are aligned in interfitting relationship, with each said contact on said rotor touching an adjacent contact on said stator and making an electrical connection therewith, each pair of touching contacts thereby creating an electrical path through said slip ring capsule, each said path being maintained whether said rotor is or is not rotating relative to said stator.

17. A cable reel as in claim 1 further comprising a cable attached thereto and extending therefrom, said cable having strain relief means attached at a free end thereof for preventing strain imparted to that portion of said cable proximal to said reel from being transmitted past said strain relief means to said free end of said cable.

18. A cable reel as in claim 1 further comprising a cable attached thereto and extending therefrom, said cable having a bitter end attached to said reel and a free end, a communication plug attached to said free end, and a retraction sleeve surrounding said sleeve adjacent said free end, said sleeve being capable of limited movement along said sleeve adjacent said free end, such that movement of said cable relative to said sleeve causes said plug to alternatively move between positions within and without said sleeve.

* * * * *